April 14, 1970   J. L. JOHNSON   3,506,260
PLURAL AXES CARNIVAL RIDE
Filed June 17, 1968   2 Sheets-Sheet 1

INVENTOR
JOHN L. JOHNSON
BY Robert M. Dunning
ATTORNEY

INVENTOR
JOHN L. JOHNSON
BY Robert M. Dunning
ATTORNEY

United States Patent Office 3,506,260
Patented Apr. 14, 1970

3,506,260
PLURAL AXES CARNIVAL RIDE
John L. Johnson, 573 St. Clair Ave.,
St. Paul, Minn. 55102
Filed June 17, 1968, Ser. No. 737,665
Int. Cl. A63g 1/26; G09b 23/00
U.S. Cl. 272—37                                    9 Claims

ABSTRACT OF THE DISCLOSURE

The carnival ride includes a supporting base which supports a rotatable support about a vertical axis. The rotatable support includes a plurality of radially extending discs. Each disc includes a pair of grooves arranged to intersect at right angles. A carriage is slidably supported in each groove. A crank arm beneath each disc rotates about the disc axis. A follower arm is supported upon vertical pivots on said carriages, holding the carriages spaced. The crank arm is pivotally and slidably connected to the follower arm beyond the periphery of the disc. Means are provided to rotate the arms about the base and to rotate the crank arm about the axis of the disc, reciprocating the carriages in their grooves. Passenger supports are provided on the vertical points.

---

This invention relates to an improvement in carnival rides, and deals particularly with a device designed to move the passengers of the ride in unusual orbital path during the operation thereof.

It is a well known fact that carnival rides, in order to be popular, must move the passengers about an unusual path, or subject them to unusual movements. The common merry-go-round supports the passengers upon vertically movable horses or other objects; the usual ferris-wheel rotates the passengers seats about an axial parallel to the axis of the wheel, and the usual rollercoaster travels the passengers about a vertically undulating and curved path. The present device is designed to move the passengers about a common central axis, and at the same time to move the passengers toward and away from the common axis, to provide a different and unusual passenger movement.

In general, the device includes a series of radially extending arms which are rotatable about a common center. Circular discs are supported near the ends of these radially extending arms, each disc including a pair of guides or tracks which intersect at right angles. A crank arm is supported beneath each disc, the crank arms being rotatable about the axis of the discs as the disc rotates about the common axis. A pair of slides or carriages is mounted upon each disc, with each pair connected by a support arm extending beyond the periphery of the disc. The supporting arms are slidably connected to the crank arm. One such slide or carriage is mounted in one of the tracks or guides, while the other carriage or slide is mounted in a right angular track or guide. With this arrangement, during rotation of the crank arm, the seat support is guided in a manner to move one end of the seat support toward and away from the common center of rotation while the other seat support is moved in a direction substantially tangent to the common center. As a result, an unusual movement is provided which is interesting and sufficiently different to give an unusual sensation to the passengers.

These and other objects and novel features of the present invention will be more clearly and fully set forth in the following specification and claims.

In the drawings forming a part of the specification.

Figure 1:
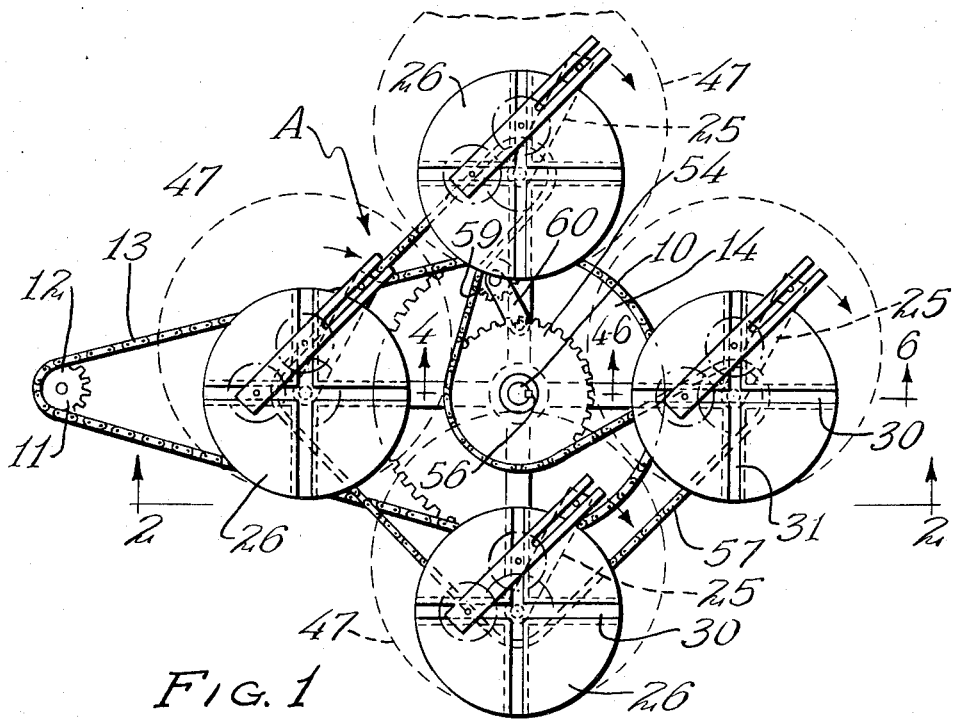
FIGURE 1 is a top plan view of a ride, showing the general arrangement of parts therein.
Figure 2:
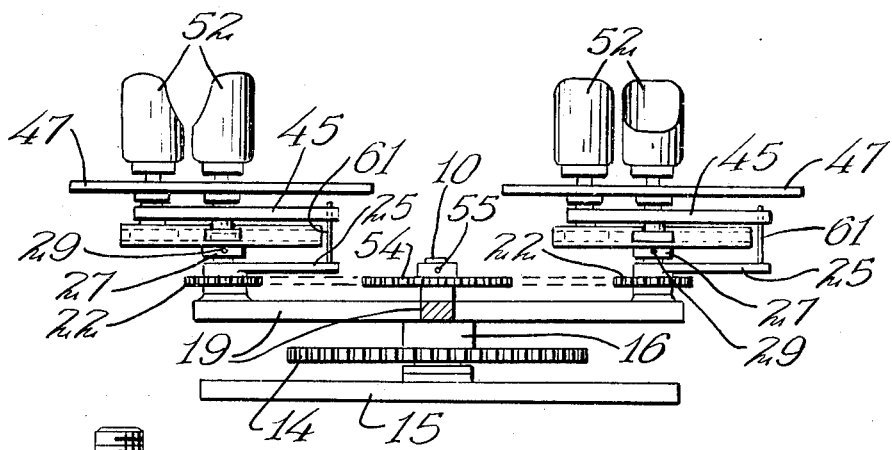
FIGURE 2 is a vertical sectional view through the apparatus, the position of the section being indicated by the the line 6—6 of FIGURE 1.
Figure 4:
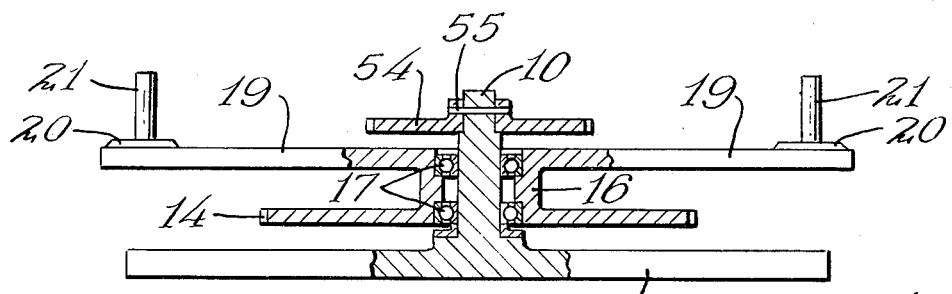
FIGURE 4 is a vertical sectional view through the center portion of the device, the position of the section being indicated by the line 4—4 of FIGURE 1.

The drawings are somewhat diagrammatic in view of the fact that the number of radially extending arms forming a common center may be increased, and the drive mechanism may obviously be varied in a desired manner. With reference first to FIGURE 1 of the drawings, the ride supported for movement about a central axle 10 arranged on a common base. The drive motor, which is not illustrated in the drawings, drives a vertical shaft 11 which supports a sprocket 12 connected by a chain 13 to a sprocket 14 on the vertical axis 10. FIGURES 2 and 4 of the drawings show the manner in which the rotation of the sprocket 14 functions to operate other portions of the structure.

Figure 6:
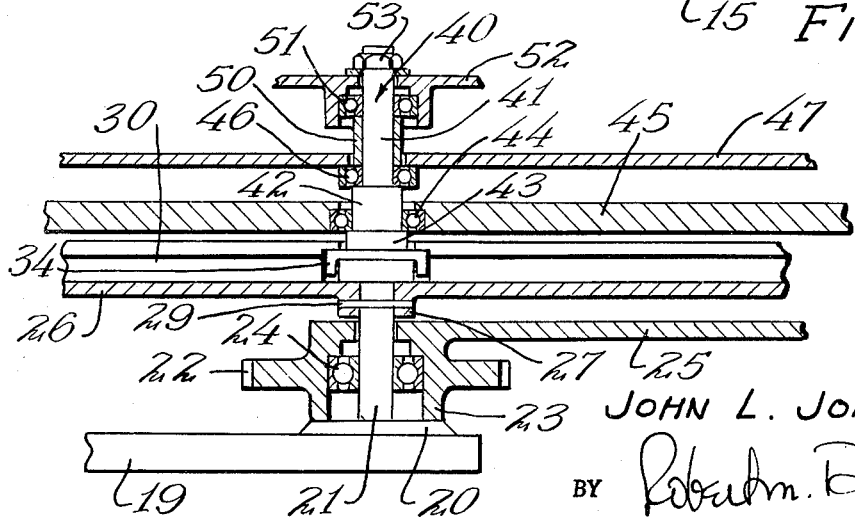
FIGURE 6 is a vertical section view through one of the discs, the position of the section being indicated by the line 6—6 of FIGURE 1.

As indicated in these figures, a base 15 is provided which is shown as circular in outline. The base 15 is provided with a vertical axis 10 which forms a common center of the device. The sprocket 14 is mounted upon a sleeve 16 supported by suitable bearings 17 encircling the central pivot 10. The upper end of the sleeve 16 supports a series of radially extending arms 19, these arms being four in number in the particular arrangement illustrated, and two opposed arms being at right angular relation to the other arms. At the outer end of each of the arms 19 a mechanism is provided which is perhaps best illustrated in detail in FIGURE 6 of the drawings. Each arm 19 is provided at its outer end with a bearing boss 20 from the center of which the vertical pivot 21 extends. A sprocket 22 includes a cylindrical hub 23 encircling the pivot 21 and rotatably supported thereupon by a bearing 24. A crank arm 25 extends radially from each sleeve 23 to act as the motivation force for the passenger support which is described. As is indicated in FIGURE 1 of the drawings, four discs 26 are mounted upon the pivots 21 in equally spaced relation from the common axis 10. FIGURE 6 indicates such a disc 26 as having a downwardly projecting hub 27 encircling the pivot 21 and pinned thereto as indicated at 29. With this arrangement, the discs 26 are held from rotation about their axis so that the right angularly extending tracks or guides thereupon remain in fixed relation to the supporting arms 19. In the particular arrangement illustrated, the disc 26 are formed with track or guides in the form of undercut radially extending grooves 30 which extend in a direction parallel to the supporting arms 19, and a similar pair of undercut grooves 31 which extend at right angles to the supporting arms 19.

Rectangular carriages 32 are supported in the grooves 30 of the discs 26, and identical slides or carriages 33 are slidable in the right angularly extending grooves 31. As the carriages are of identical form, the structure thereof will be given identifying numerals which are similar.

Figure 5:
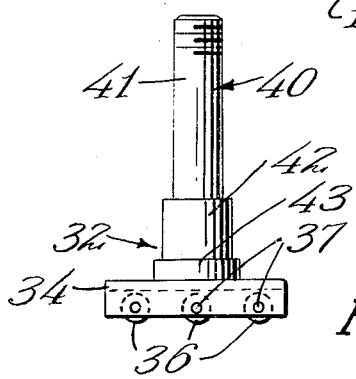
FIGURE 5 is an elevational view of one of the movable slides which ride in the intersecting track of the discs.

Each of the slides or carriages such as 32 in FIGURE 5 include a rectangular block 34 which is of proper dimensions to fit within the upper edges 35 of a slot such as 30. Rollers 36 are mounted upon parallel shafts 37 extending transversely through the block 34, the rollers 37 sitting into the undercut side 39 of the grooves such as 30. In other words, the block 34 may move longitudinally of the groove, and the rollers slidably support the block and hold the block engaged with the disc 26.

A seat supporting shank 40 extends upwardly from the center portion of each portion of the block 34. The seat supporting shank 40 includes an upper end portion 41, a slightly larger diameter portion 42, and still a larger diameter portion 43. The purpose of this arrangement will become more evident upon an examination of FIGURE 6 of the drawings.

A thrust bearing 44 is supported by the largest diameter portion 43 of the seat supporting shank 40, and supports a follower arm 45 which functions in the movement of the seat, as will be described. A thrust bearing 46 encircles a smaller diameter portion 41 of the shank 40 and rests upon the intermediate portion 42 of the shank. The bearing 46 includes a platform 47 which is provided merely to cover up the operating arms of the unit and to prevent any chance of injury to passengers. The platform 47 travels in an orbital path about the centers of the discs 26, and are shown as circular disc like members having their axis integral with the seat shanks of certain of the slides. As will be noted in FIGURE 1 of the drawings, the platforms 47 which are to the left and to the right of the common axis 10 are concentric with the seat shank connected to the slides 33 which are in right angular relation to the supporting arms 19. The platforms 47 which are above and below the common center 10 are concentric with the seat shank 40 mounted upon the slides 32 which move parallel to the supporting arms 19.

A spacing sleeve 50 is supported about the intermediate diameter portion 42 of each seat shank 40, and supports a bearing 51 which in turn supports a seat 52 which may comprise a seat for a single occupant, or a bowl or saucer shaped receptacle designed to support a plurality of passengers, depending upon the size of the apparatus. The seat 52 is rotatable about the axis of the shank 40, and is held in place by a suitable nut such as 53 threaded onto the threaded upper end of the shank 40.

As indicated in FIGURE 1 of the drawings, a sprocket 54 is supported upon the central pivot 10, this sprocket 54 being held from rotation relative to the pivot 10 by the pin 55 or key 56 indicated in FIGURE 1 and FIGURE 2. A chain 57 extends about the sprockets 22 on each pivot 21 on the various arms 19, and the chain extends about the sprocket 54 on the central pivot 10 as indicated in FIGURE 1. An idler sprocket 59 is mounted upon an arm 60 and is engageable with the chain 57 to take up any slack therein. The purpose of this arrangement is to cause rotation of the sprockets 22 encircling each of the vertical pivots 21, and to rotate the radially extending crank arm 25 connected therewith. As is evident from FIGURE 1, the sprockets 22 are of relatively small diameter as compared to the sprocket 54, and as a result, each crank arm 25 may rotate about its axis more than once for each rotation of the sprocket 14 and the arms 19 connected thereto.

Figure 3:
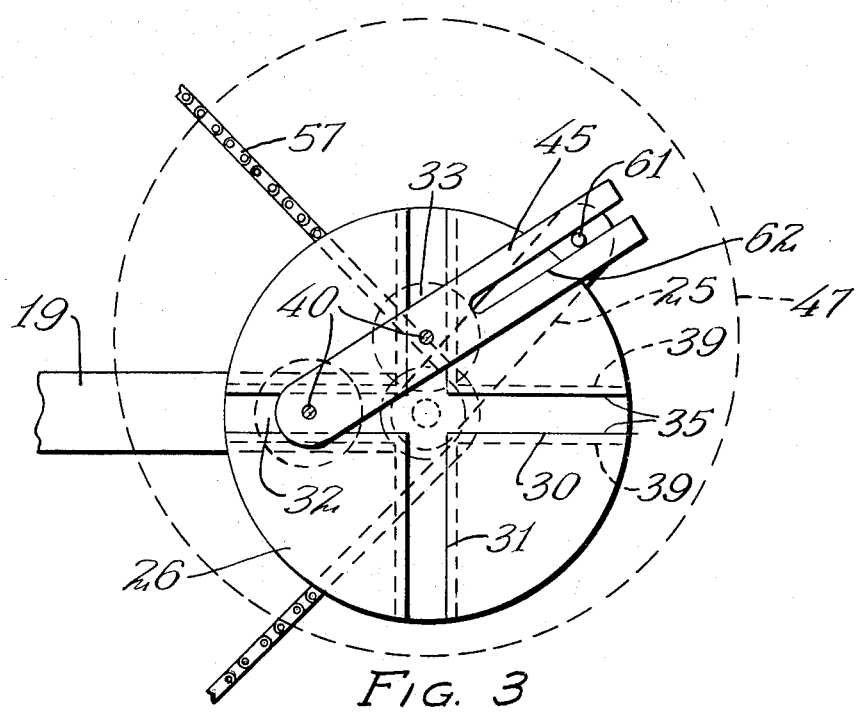
FIGURE 3 is a top plan view of one of the rotatable discs, showing in dotted outline the crank arm underlying the disc, and showing in full lines the seat or passenger supporting arm mounted on the upper surface of the disc.

Referring now to FIGURES 2 and 3 of the drawings, it will be noted that each crank arm 25 is provided at its outer end with a vertically extending pivot 61 which extends upwardly beyond the periphery of the corresponding disc 26. Each seat supporting arm 45 is supported by two vertical pivots 40, one of which extends upwardly from a slide or carriage 32, while the other of which extends upwardly from the slide or carriage 33. The vertical pivot 61 of each crank arm is engaged in a slot 62 in the seat supporting arm 45. As a result, with reference to FIGURE 3, clockwise movement of the crank arm 25 will cause the carriage or slide 32 to move to the left in the track 30, and to cause the slide 33 to move downwardly in the track 31 until the crank arm 25 is parallel to the groove 30. Further clockwise movement of the crank arm 25 causes the carriage or slide 33 to continue its downward movement in the the groove 31, and causes the carriage 32 to move to the right in the groove 30. When the crank arm 25 swings into alignment with the groove 31, continued movement of the crank arm causes the carriage 32 to pass the center point and continue its movement to the right in the groove 30, while the carriage 33 is moved upwardly in the track 31. This movement continues until the crank arm 25 again becomes aligned with the groove 30 at which time the carriage 33 is at the center point of the disc while the carriage 32 is at the right hand side thereof. Further clockwise movement of the crank arm 25 continues the upward movement of the carriage 33 and left hand movement of the carriage 32 until when the crank arm 25 is aligned with the groove 31, the carriage 32 again reaches the center portion of the disc and the carriage 33 is at the upper end of the groove 31.

It will be seen that during the operation of the apparatus, the seats or supports 52 are moved about the common center of the device. The seats 52 mounted upon the carriages 33 move back and forth in a direction tangent to the axis of the pivot 10, thus causing the seats to first move slower than the speed of the discs 26, and then to move faster than the speed of these discs. The seats mounted upon the carriages 32 simultaneously move toward and away from the center of rotation 10. The path of movement of the two seat supports continuously crosses so that the person of one seat are first on one side of the persons or person in the other seat, and then on the other side thereof. As a result, a novel and interesting ride is provided which is relatively simple in that it is driven from a common source of motive power.

In the foregoing description, the members 26 have been described as discs as they are shown in circular form. Actually, the members 26 need not be round, and could be shaped like a cross.

In accordance with the patent statutes, I have described the principles of construction and operation of my improvement in carnival rides, and while I have endeavored to set forth the best embodiment thereof I desire to have it understood that changes may be made within the scope of the following claims without departing from the spirit of my invention.

I claim:

1. A carnival ride including:
   a base,
   a vertical pivot on said base,
   a rotary support pivotally supported by said pivot and including an arm extending radially from the axis of said pivot,
   a disc supported by said arm near the outer extremity thereof,
   a pair of guides on the upper surface of said disc intersecting at right angles,
   a carriage slidably supported in each of said guides and movable longitudinally thereof,
   a crank arm rotatably supported beneath said disc and coaxial therewith, said crank arm extending beyond the periphery of said disc,
   said carriages each including a vertical pivot,
   a follower arm pivotally supported on said vertical pivots on said carriages and extending beyond the periphery of said disc,
   passenger supports on said carriages, means pivotally and slidably connecting the ends of said crank arm and said follower arm which project beyond said disc,
   means for rotating said rotary support about its axis, and
   means for rotating said crank arm about its axis to slide said carriages in said intersecting guides upon said disc.

2. The structure of claim 1 and in which said rotary support includes a plurality of radially extending arms each supporting a disc of the type described.

3. The structure of claim 1 and in which said passenger supports are pivotally supported coaxially with said vertical pivots on said carriages.

4. The structure of claim 1 and in which said pivotal and slidable connecting means includes a vertical pin on said crank arm and a longitudinally extending slot in said follower arm in which said pin is engaged.

5. The structure of claim 1 and including a platform mounted upon said vertical pivots and movable in an orbital path therewith.

6. The structure of claim 1 and in which said guides on said disc comprise intersecting grooves.

7. A carnival ride including:
a base,
a pivot support on said base,
a rotary support including a plurality of radially extending arms axially supported on said pivot support for rotary movement about the axis of said pivot support,
a disc secured to each said arm in fixed relation to the arm,
a crank are having a rotatable support coaxial with each said disc beneath said disc said arm extending beyond the periphery of the disc,
a pair of guides on the upper surface of each said disc and intersecting at right angles,
a carriage supported in each of said guides for movement longitudinally thereof,
a follower arm pivotally supported above each said disc by parallel vertical pivots on said carriages holding said carriages in spaced relation,
means pivotally and slidably connecting each said crank arm to a corresponding follower arm beyond the periphery of the corresponding disc,
means for rotating said arms about said radially extending pivot support and means pivoting said crank arms about the axes of said discs, and
passenger supporting means on each said carriage.

8. The structure of claim 8 and in which said means pivoting said crank arms includes a fixed sprocket coaxial with said pivot support and held from rotation, sprockets coaxial with each crank arm rotatable support and rotatable therewith, and a chain extending partially about said fixed sprocket and partially about said sprockets coaxial with each said crank arm rotatable support whereby rotation of said rotary support will cause rotation of said crank arms about their rotatable support axes.

9. The structure of claim 8 and in which said passenger supporting means are rotatable about vertical axes on said carriages.

References Cited

UNITED STATES PATENTS

| | | | |
|---|---|---|---|
| 2,396,382 | 3/1946 | Maibaum. | |
| 2,721,081 | 10/1955 | Sipior | 272—37 |
| 2,864,615 | 12/1958 | Castille | 272—37 |

FOREIGN PATENTS 6,524  9/1875  Italy.

ANTON O. OECHSLE, Primary Examiner

A. W. KRAMER, Assistant Examiner

U.S. Cl. X.R.

35—10